United States Patent [19]

Hemfort et al.

[11] 4,369,698

[45] Jan. 25, 1983

[54] ARRANGEMENT FOR SEPARATING FRUITS INTO FRUIT PULP, FRUIT SKIN AND FRUIT CORE

[75] Inventors: Heinrich Hemfort, Oelde, Fed. Rep. of Germany; August Peitzmann, Woodside, Calif.; Wilhelm Neukötter, Oelde, Fed. Rep. of Germany; Gunthard Pautsch, Oelde, Fed. Rep. of Germany; Hubert Güunnewig, Oelde, Fed. Rep. of Germany

[73] Assignee: Westfalia Separator AG, Oelde, Fed. Rep. of Germany

[21] Appl. No.: 238,989

[22] Filed: Mar. 2, 1981

[30] Foreign Application Priority Data

Mar. 4, 1980 [DE] Fed. Rep. of Germany ....... 3008132

[51] Int. Cl.³ ............................................... A23N 1/00
[52] U.S. Cl. ....................................... 99/486; 99/495; 99/509; 99/540; 99/547; 210/145; 210/374; 494/9; 494/36
[58] Field of Search ................................. 99/276–278, 99/486, 495, 348, 509–513, 540, 547; 233/7; 210/145, 360.2, 372–375, 377, 403; 68/23 R, 12 R; 241/36

[56] References Cited

U.S. PATENT DOCUMENTS

| | | | |
|---|---|---|---|
| 1,630,201 | 5/1927 | Metcalfe | 210/145 |
| 2,043,662 | 6/1936 | Howe | 210/374 |
| 3,411,631 | 11/1968 | Elsken et al. | 210/374 |
| 3,438,501 | 4/1969 | Oyen | 210/374 |
| 3,504,794 | 4/1970 | Tholl et al. | 210/145 |
| 4,299,353 | 11/1981 | Bruning et al. | 233/7 |

FOREIGN PATENT DOCUMENTS 2750787 11/1977 Fed. Rep. of Germany ........ 99/495

Primary Examiner—Philip R. Coe
Assistant Examiner—Timothy F. Simone
Attorney, Agent, or Firm—Michael J. Striker

[57] ABSTRACT

An arrangement for continuously separating fruits has a housing, a sieve element rotating in the housing and a hammer element rotating inside the sieve element, wherein the sieve element rotates with the speed which is lower than the speed of rotation of the hammer element and the relation between the speeds of rotation of the hammer element and the sieve element is within the region of between 2:1 and 4:1. A method of continuously separating fruits include withdrawing the extracted fruit juice from the inventive arrangement and supplying the same into a screw centrifuge so as to clarify the fruit juice in the latter and to produce a white wine. Red pigment of the fruit skin can be introduced into the fruit juice so as to produce a red fruit wine.

17 Claims, 4 Drawing Figures

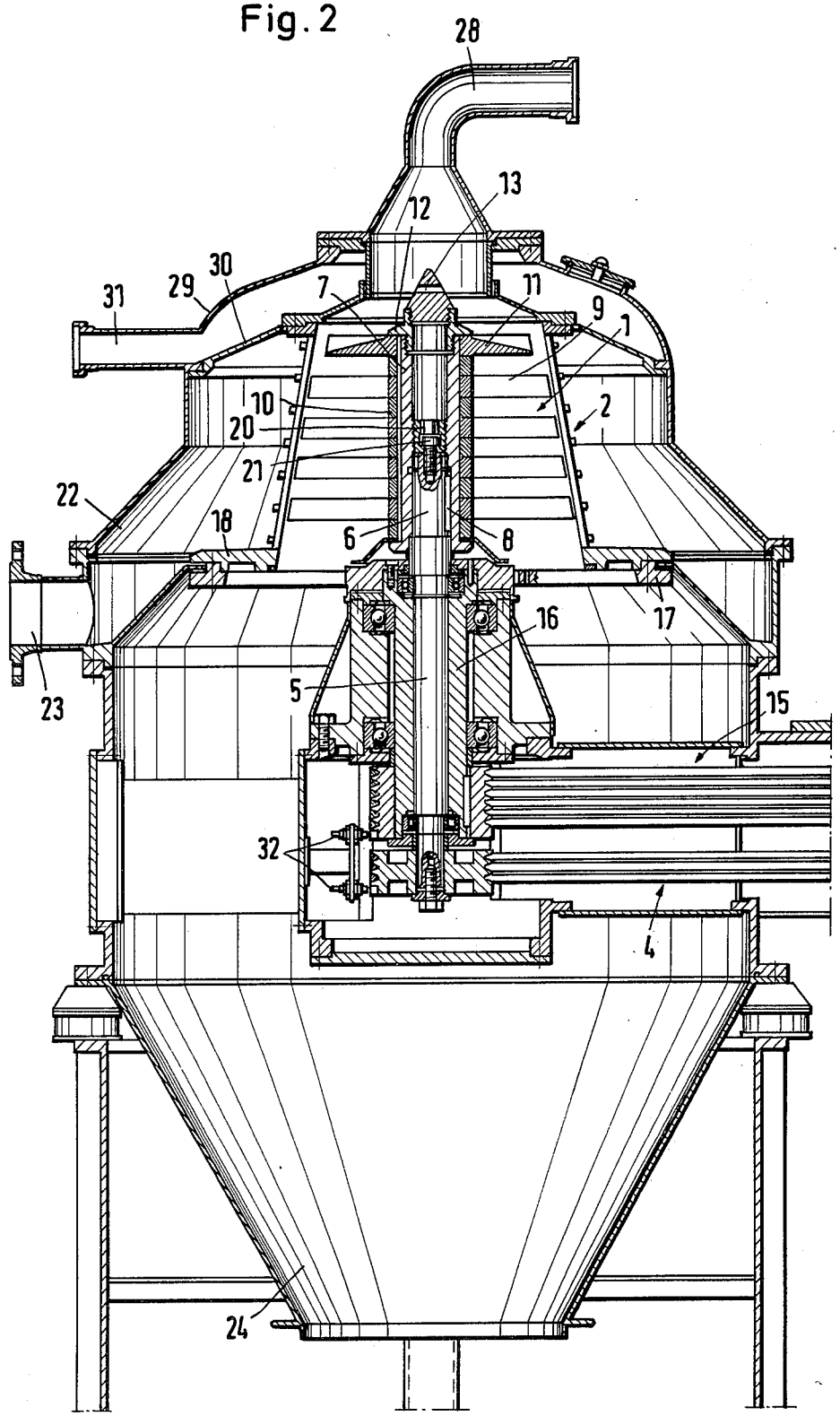

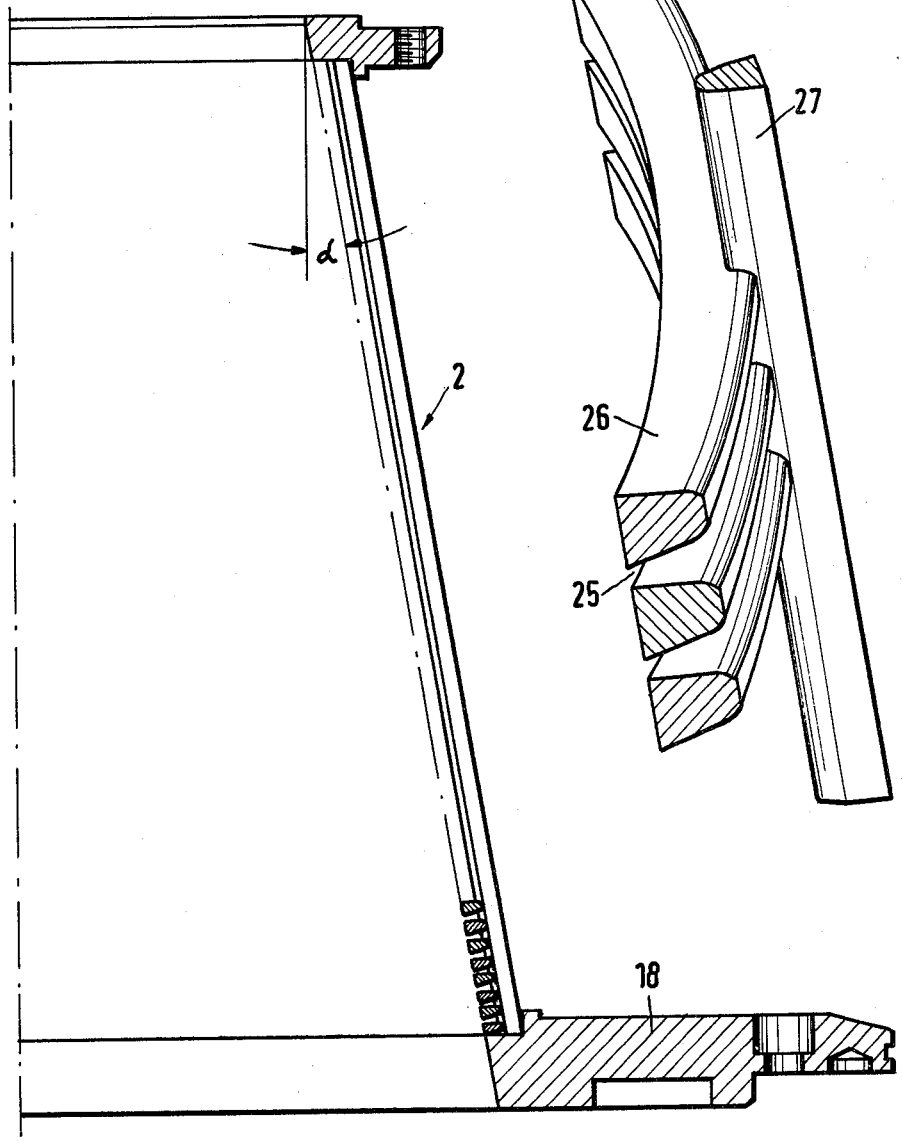

ARRANGEMENT FOR SEPARATING FRUITS INTO FRUIT PULP, FRUIT SKIN AND FRUIT CORE

BACKGROUND OF THE INVENTION

The present invention relates to an arrangement for continuously separating a fruit pulp from a fruit skin and the fruit core or fruit cores, particularly for separating a grape pulp from a grape skin and a grape core, and a method of producing a wine from the fruits.

Arrangements of the above-mentioned general type are known in the art. One such arrangement is described in the German Offenlegungsschrift No. 2,750,787 and has a housing, a sieve basket, and a rotor surrounded by the sieve basket and having a radial support which is equipped with a hammer head. The speed of rotation of the rotor differs from the speed of rotation of the sieve basket by at least 10%, and the distance between the sieve basket and the hammer heads can be adjusted by an adjusting device. For displacing the products from one hammer head to the other hammer head, the supporting elements provided with the hammer heads are staggered and arranged on the rotor.

SUMMARY OF THE INVENTION

Accordingly, it is an object of the present invention to provide an arrangement for continuously separating fruits which is an improvement of the above-mentioned arrangement disclosed in the German Offenlegungsschrift No. 2,750,787.

More particularly, it is an object of the present invention to provide a separating arrangement in which the difference between the speeds of rotation of the sieve element and the hammer element is sufficient for peeling a fruit skin from a fruit pulp, and the speed of rotation of the hammer element is limited so as to provide for crushing of the fruit core.

In keeping with these objects and with others which will become apparent hereinafter, one feature of the present invention resides, briefly stated, in an arrangement in which the sieve basket rotates with a lower speed of rotation than the hammer element, and the relation between the speed of rotation of the hammer element and the speed of rotation of the sieve basket is within the region of 2:1 to 4:1.

Thereby a good treatment of grapes or berries and a good separation of the fruit core and fruit skin or fruit shell are provided. The speed of rotation of the sieve basket can be equal to, for example 400 revolutions per minute, and the speed of rotation of the hammer element can be equal to between 800 and 1,600 revolutions per minute.

Since the speeds of rotation of the hammer element and the sieve basket are limited because of the requirements made to the strengths of these parts, it is advantageous when in accordance with another feature of the present invention the sieve basket and the hammer element rotate in opposite directions. In such a construction, in condition of an identical difference of the circumferential speeds of the sieve basket and the hammer element, a lower speed of rotation of the hammer element and thereby a smaller force consumption for the drive of the arrangement take place.

In accordance with still another advantageous feature of the present invention, the sieve basket is conical and has a cone angle equal to substantially between 10° and 15°. Thereby a sufficient time of treatment of the product in the sieve basket and a good output of juice take place. When the above-mentioned cone angle of the sieve basket is provided, the fruit skin and fruit core are substantially subjected to drying.

A further feature of the present invention resides in a method of producing wine by separation of fruits in the inventive arrangement, in which the sieve basket and the hammer element rotate with the above-mentioned speeds of rotation.

In accordance with the inventive method the fruit juice produced during the separation and enriched with the fruit skin or skin-free, is withdrawn from the arrangement (the hammer sieve centrifuge) and supplied to a screw centrifuge for further juice clarification.

In accordance with still a further feature of the present invention, red wine may be produced from the fruit skin by extraction of the color pigment and admixing the same to the finished wine.

In accordance with an additional feature of the present invention, the fruit skin can remain in the fruit juice, and the color pigment extraction from the fruit skin can be performed during the fermentation process.

In accordance with the inventive method of producing white wine, the grapes and berries removed from stems are supplied into the inventive arrangement (the hammer sieve centrifuge) in which the juice is separated from the fruit skins, fruit cores, and stem particles. The sieve basket is provided with openings whose diameter is smaller than the diameter of the fruit core. Since the fruit skins, fruit cores, and fruit stems are finely treated in the hammer sieve centrifuge, the yield of juice with conventional pressing processes contains a small mean value of tanning substances which are predominantly bounded in the fruit pulp and do not go into the juice in solution. With a predetermined grape sort and ripening degree, this value after treatment in the hammer sieve centrifuge is equal for example to 800 ppm, whereas the value after treatment in conventional presses is equal to approximately 1,000 ppm.

The juice is subsequently subjected to additional clarification in a screw centrifuge. The juice obtained from the screw centrifuge contains unexpectedly from approximately between 500 to 600 ppm of tanning substances, since a part of the tanning substance bounded in the fruit pulp is carried out with the fruit pulp centrifuge in the screw centrifuge.

In accordance with the inventive method, red wine is produced with the utilization of the inventive hammer sieve centrifuge. In this case the sieve basket has elongated slots with a width which is smaller than the diameter of the fruit core, and a length which equals to at least three times the fruit core diameter. The fruit skins are supplied to the slots of the sieve basket into the juice, whereas the fruit cores, the fruit stem particles and the like are separated. Because of the utilization of the hammer sieve centrifuge, the contents of the tanning substances in the mash can be reduced for a certain grape sort to between 2,000 and 1,200 ppm.

This juice which contains the fruit skins is subjected, in accordance with the inventive method, to a fermentation process, and the pigment from the fruit skin of the red berries goes to the partially fermented juice or wine in solution.

The partially fermented juice or wine can be supplied for clarification and centrifuging of the fruit skins to a screw centrifuge.

The novel features which are considered as characteristic for the invention are set forth in particular in the appended claims. The invention itself, however, both as to its construction and its method of operation, together with additional features and advantages thereof, will be best understood from the following description of specific embodiments when read in connection with the accompanying drawings.

BRIEF DESCRIPTION OF THE DRAWING

FIG. 2 is a view showing a vertical section of the arrangement of FIG. 1;

FIG. 3 is a view showing a vertical section of a sieve basket of the inventive arrangement; and FIG. 4 is a perspective view of a portion of the sieve basket of FIG. 3.

DESCRIPTION OF THE PREFERRED EMBODIMENT

Figure 1:
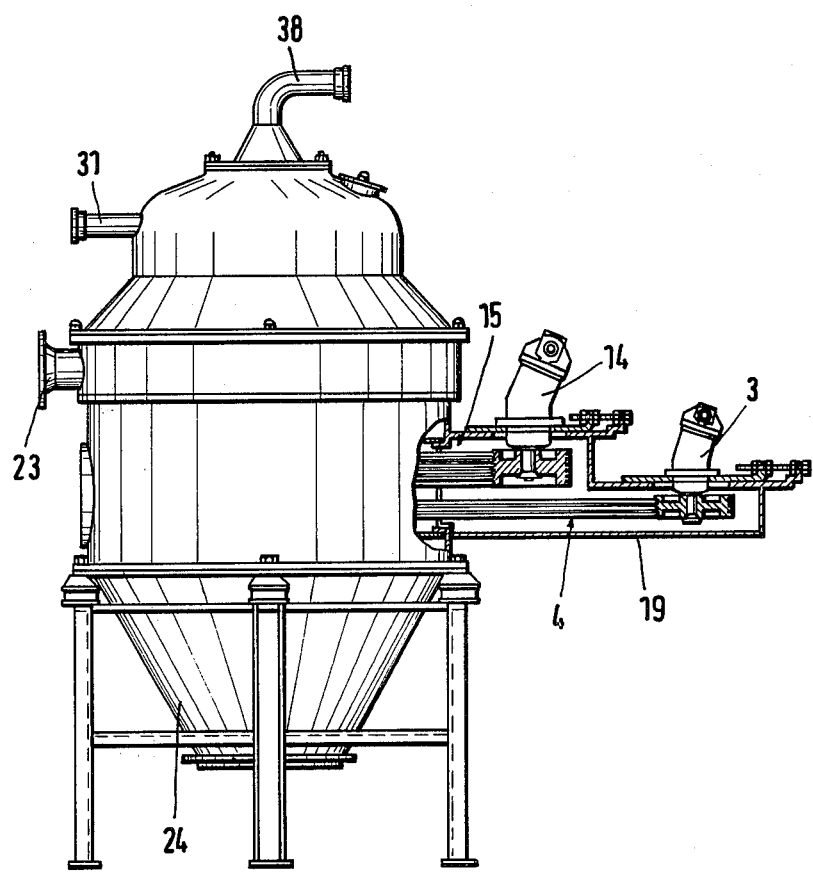
FIG. 1 is a view showing an arrangement for separating fruits (hammer sieve centrifuge) in accordance with the present invention.

An arrangement for separating of fruits in accordance with the present invention includes a hammer element which is identified by reference numeral 1 and a sieve element or basket which is identified by reference numeral 2. The sieve basket 2 is arranged inside a housing and the hammer element 1 is arranged inside the sieve basket. The hammer element 1 and the sieve basket 2 rotate with different speeds of rotation so that the speed of rotation of the sieve element is lower than the speed of rotation of the hammer element. Advantageously the relation between the speeds of rotation of the hammer element and the sieve basket is within the region of between 2:1 and 4:1. Advantageously, the hammer element 1 and the sieve basket 2 rotate in opposite directions.

The drive of the hammer element 1 is carried out via a motor 3, a V-belt 4, and a shaft 5 provided with a pin 6 which engages with a hollow shaft 7. The hammer element 1 is mounted on the hollow shaft 7. The hollow shaft 7 is connected with the pin 6 of the shaft 5 by at least one spring 8.

The hammer element 1 includes a plurality of hammer units which are located one above the other in the axial direction. Individual hammers 9 extend diametrically opposite to one another and are connected with a hub 10. Each hammer unit has, for example, two hammers, or more hammers which are arranged in cross-like or other manner. The individual hammer units can be so mounted on the hollow shaft 7 that the neighboring hammer units are offset relative to one another by a predetermined angular distance. Since the hammer element has a greater number of hammers in the upper region than in the lower region, all supplied fruits are crushed in the upper region.

The hammer 9 has an identical height over its entire length. The hammer is so arranged with its inclined lateral surfaces that during the rotation an impact action in downward direction is carried out. The lateral surfaces have the conicity of the sieve basket. The upper locking member of the hammer element 1 forms a regulating disc 11 which is also mounted on the hollow shaft 7 and retained by a threaded member 12. The threaded member 12 is screwed into the hollow shaft 7 to its annular flange, as can be seen from FIG. 2. An inlet cone 13 is mounted on the threaded member 12.

The drive of the sieve basket 2 is performed via a motor 14, a V-belt drive 15, and a hollow shaft 16. A flange 17 is mounted on the hollow shaft 16 and connected with a connecting flange 18 of the sieve basket 2. The motors 3 and 14 are mounted on a supporting member or beam 19 which has a stepped construction.

The hammer element 1 can be adjusted relative to the sieve basket 2. The adjustment of the hollow shaft 7 of the hammer element 1 in the longitudinal direction is performed with the aid of a threaded sleeve 20 which engages with its outer thread in an inner thread of the hollow shaft 7 and abuts with its lower end against the pin 6 of the shaft 5. The hammer element 1 and the sieve basket 2 can be so adjusted relative to one another that rubbing of hammers against the sieve basket are avoided. The threaded sleeve 20 is mounted on the pin 6 with the aid of the screw 21.

The sieve basket 2 can be composed of an outer sieve basket and an inner sieve basket inserted into the outer sieve basket. The sieve may have openings whose diameter is smaller than the core diameter of the fruits supplied into the arrangement. In this case only the juice and the fruit pulp travels into a chamber 22 from which they are withdrawn via a pipe 23. The fruit cores and the fruit skins are withdrawn from the arrangement via a bottom funnel 24.

As can be seen from FIGS. 3 and 4, the sieve basket 2 can be provided with elongated slots 25. The slots 25 are limited by shaped rings 26 and shaped bars 27 extending in the longitudinal direction along generatrices of the sieve basket.

The slots 27 have a width which is smaller than the diameter of the core and a length which is equal to at least three times the core diameter. The slots may extend in a horizontal direction, but also in the longitudinal direction of the sieve basket which is advantageous. As can be seen from the drawing, the slots have a flow cross-section increasing in an outward direction. In the operation of the hammer sieve centrifuge, the fruit skins are also supplied into the chamber 22 so that the produced juice contains the fruit skins.

The sieve basket 2 has a cone angle which is equal to substantially between 10° and 15°. The loading of the hammer sieve centrifuge is carried out via a supply pipe 28. The fruits are supplied to the hammer element 1 via the supply pipe 28 and the regulating disc 11 which ends at a distance from the sieve basket 2, the distance being greater than the diameter of the fruits.

The arrangement has a stationary hood 29 provided with an overflow bottom 30. In the event of overflowing of the sieve basket 2, the juice or the fruit particles can be withdrawn from the arrangement through pipes 31.

The fruit skins and cores slide being supported by the adjusted rotatable hammers, inwardly lengthwise of the sieve basket 2 in downward direction. During this process they travel in a constantly increasing centrifugal field, and finally reach the funnel 24 in dry state.

For monitoring the speed of rotation of the sieve basket 2 and the hammer element 1, a sensing arrangement 32 is provided. When the speed of rotation of the sieve basket exceeds a predetermined value, the sensing arrangement 32 first stops the hammer element 1 and then stops the sieve basket 2.

In accordance with the inventive method, the extracted fruit juice may be additionally withdrawn from the housing into a screw centrifuge and clarified in the latter so as to produce a white wine. The withdrawing and clarifying of the fruit juice may be performed for the fruit juice enriched with the fruit skin or for the skin-free fruit juice.

The fruit juice may be subjected to a fermentation process, and during the latter the red pigment of the fruit skin goes into solution of the fruit juice so as to produce a red wine. The partially fermented fruit juice may be withdrawn from the housing into a screw centrifuge for clarifying and centrifuging of the fruit skin from the fruit juice. The wine may also be withdrawn from the inventive arrangement and supplied into a screw centrifuge for clarifying and centrifuging purposes.

It will be understood that each of the elements described above, or two or more together, may also find a useful application in other types of constructions differing from the types described above.

While the invention has been illustrated and described as embodied in an arrangement for separating fruits it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for continuously separating a fruit pulp from a fruit skin and a fruit core of a fruit having a predetermined diameter, comprising a housing; a conical sieve element rotating in said housing; a hammer element rotating inside said sieve element so that the latter surrounds the former and including a plurality of conical hammer units detachably arranged and spaced from one another in an axial direction; means for rotating said hammer element with a predetermined speed of rotation and including a hollow shaft carrying said hammer units of said hammer element so as to form an axis of rotation of the latter and a driven shaft having a pin engaging in said hollow shaft; means for rotating said sieve element with a speed of rotation which is lower than the speed of rotation of said hammer element, so that the relation between the speed of rotation of said hammer element and the speed of rotation of said sieve element is within the region of between 2:1 and 4:1; means for adjusting said hammer units and arranged between said hollow shaft and said pin of said driven shaft; and a regulating disc located inside said sieve element above said hammer element and spaced from an inner surface of said sieve element by a distance which is greater than the diameter of the fruit.

2. An arrangement as defined in claim 1; and further comprising means for sensing the speed of rotation of said sieve element and the speed of rotation of said hammer element, and control means operative for stopping said sieve element and said hammer element when the speed of rotation of said sieve element exceeds a predetermined value, said control means being connected with said sensing means and operating so that said control means first stops said hammer element and thereafter stops said sieve element.

3. An arrangement as defined in claim 1, wherein said means are arranged so that said sieve element and said hammer element rotate in opposite directions.

4. An arrangement as defined in claim 1, wherein said sieve element is conical and has a cone angle equal to substantially between 10° and 15°.

5. An arrangement as defined in claim 1, wherein a fruit core to be separated has a predetermined diameter, said sieve element having a plurality of slots with a width which is smaller than the diameter of the fruit core, and a length which is equal to at least three times of the diameter of the fruit core.

6. An arrangement as defined in claim 5, wherein said slots of said sieve element extend in a horizontal direction.

7. An arrangement as defined in claim 5, wherein said slots of said sieve element extend in a vertical direction.

8. An arrangement as defined in claim 5, wherein said slots of said sieve element has a flow cross section which conically increases in an outward direction.

9. An arrangement as defined in claim 1, wherein a fruit core to be separated has a predetermined diameter, said sieve element having a plurality of openings with a diameter which is smaller than the diameter of the fruit core.

10. An arrangement as defined in claim 1, wherein said shafts are spaced from one another in an axial direction, each of said hammer units having a hub mounted on said hollow shaft and at least two elongated diametrically opposite hammer members each extending from the respective hub and having an identical height over its entire length.

11. An arrangement as defined in claim 10, wherein each of said hammer units has more than two such hammer members extending from the same hub.

12. An arrangement as defined in claim 1, wherein said hollow shaft has an inner thread, said adjusting means including a sleeve provided with an outer thread engageable with said inner thread of said hollow shaft, said sleeve having an end portion abutting against and connected with said driven shaft.

13. An arrangement as defined in claim 12; and further comprising means for connecting said end portion of said sleeve with said driven shaft, said connecting means including a screw.

14. An arrangement as defined in claim 1, wherein said means for rotating said hammer element includes a hollow shaft carrying the latter, said regulating disc being mounted on said hollow shaft.

15. An arrangement as defined in claim 14; and further comprising means for mounting said regulating disc on said hollow shaft and including an intermediate threaded member.

16. An arrangement as defined in claim 15; and further comprising an inlet cone connected with said threaded member of said mounting means.

17. An arrangement as defined in claim 1; and further comprising a frame including a stepped support element, said means for rotating said sieve element including a first drive motor, said means for rotating said hammer element including a second drive motor, said drive motors being mounted on said stepped supporting element of said frame.

* * * * *